US 7,392,437 B2

(12) United States Patent
Bowlby et al.

(10) Patent No.: US 7,392,437 B2
(45) Date of Patent: Jun. 24, 2008

(54) METHOD AND SYSTEM FOR TESTING HOST BUS ADAPTERS

(75) Inventors: Gavin J Bowlby, Vista, CA (US); David E. Woodral, Walnut, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 655 days.

(21) Appl. No.: 11/039,189

(22) Filed: Jan. 20, 2005

(65) Prior Publication Data

US 2006/0161702 A1    Jul. 20, 2006

(51) Int. Cl.
*G06F 11/00* (2006.01)
(52) U.S. Cl. .............................. 714/56; 714/43; 714/44; 710/71
(58) Field of Classification Search ................... 714/56; 710/71
See application file for complete search history.

(56) References Cited

U.S. PATENT DOCUMENTS

| | | | |
|---|---|---|---|
| 4,268,906 A | 5/1981 | Bourke et al. | |
| 4,333,143 A | 6/1982 | Calder | |
| 4,449,182 A | 5/1984 | Rubinson | |
| 4,549,263 A | 10/1985 | Calder | |
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 5,129,064 A | 7/1992 | Fogg, Jr. et al. | |
| 5,212,795 A | 5/1993 | Hendry | |
| 5,249,279 A | 9/1993 | Schmenk et al. | |
| 5,276,807 A | 1/1994 | Kodama et al. | |
| 5,280,587 A | 1/1994 | Shimodaira et al. | |
| 5,321,816 A | 6/1994 | Rogan et al. | |
| 5,347,638 A | 9/1994 | Desai et al. | |
| 5,371,861 A | 12/1994 | Keener et al. | |
| 5,388,237 A | 2/1995 | Sodos | |
| 5,448,702 A | 9/1995 | Garcia, Jr. et al. | |
| 5,469,453 A | 11/1995 | Glider et al. | |

(Continued)

FOREIGN PATENT DOCUMENTS

EP    0738978    10/1996

(Continued)

OTHER PUBLICATIONS

International Preliminary Report on Patentability dated Mar. 13, 2007, for International patent application No. PCT/US2005/031661.

(Continued)

*Primary Examiner*—Christopher S McCarthy
(74) *Attorney, Agent, or Firm*—Klein, O'Neiil & Singh, LLP; TJ Singh

(57) ABSTRACT

A system and method to test a host bus adapter's ("HBAs") ability to handle stream of invalid characters is provided. A data presenter module presents data to a HBA without being aware of a data format. A data producer module that is aware of the data format and schedules special characters so that the HBA can perform alignment operations. A bit offset change module changes a bit offset that is used by the data presenter module and causes to send random serial data to the HBA, which results in loss of alignment in the HBA and causes the HBA to decode invalid characters.

16 Claims, 7 Drawing Sheets

U.S. PATENT DOCUMENTS

| | | | |
|---|---|---|---|
| 5,568,614 | A | 10/1996 | Mendelson |
| 5,613,162 | A | 3/1997 | Kabenjian et al. |
| 5,647,057 | A | 7/1997 | Roden et al. |
| 5,664,197 | A | 9/1997 | Kardach et al. |
| 5,671,365 | A | 9/1997 | Binford et al. |
| 5,729,762 | A | 3/1998 | Kardach et al. |
| 5,740,467 | A | 4/1998 | Chmielecki, Jr. et al. |
| 5,758,187 | A | 5/1998 | Young |
| 5,761,427 | A | 6/1998 | Shah et al. |
| 5,828,856 | A | 10/1998 | Bowes et al. |
| 5,828,903 | A | 10/1998 | Sethuram et al. |
| 5,835,496 | A * | 11/1998 | Yeung et al. ............... 370/514 |
| 5,875,343 | A | 2/1999 | Binford et al. |
| 5,881,296 | A | 3/1999 | Williams et al. |
| 5,892,969 | A | 4/1999 | Young |
| 5,905,905 | A | 5/1999 | Dailey et al. |
| 5,917,723 | A | 6/1999 | Binford |
| 5,968,143 | A | 10/1999 | Chisholm et al. |
| 5,983,292 | A | 11/1999 | Nordstrom et al. |
| 6,006,340 | A | 12/1999 | O'Connell |
| 6,049,802 | A | 4/2000 | Waggener, Jr. et al. |
| 6,055,603 | A | 4/2000 | Ofer et al. |
| 6,078,970 | A | 6/2000 | Nordstrom et al. |
| 6,105,122 | A | 8/2000 | Muller et al. |
| 6,115,761 | A | 9/2000 | Daniel et al. |
| 6,118,776 | A | 9/2000 | Berman |
| 6,134,617 | A | 10/2000 | Weber |
| 6,185,620 | B1 | 2/2001 | Weber et al. |
| 6,233,244 | B1 | 5/2001 | Runaldue et al. |
| 6,269,413 | B1 | 7/2001 | Sherlock |
| 6,353,612 | B1 | 3/2002 | Zhu et al. |
| 6,397,277 | B1 | 5/2002 | Kato et al. |
| 6,408,349 | B1 | 6/2002 | Castellano |
| 6,425,021 | B1 | 7/2002 | Ghodrat et al. |
| 6,425,034 | B1 | 7/2002 | Steinmetz et al. |
| 6,434,630 | B1 | 8/2002 | Micalizzi, Jr. et al. |
| 6,457,090 | B1 | 9/2002 | Young |
| 6,463,032 | B1 | 10/2002 | Lau et al. |
| 6,502,189 | B1 | 12/2002 | Westby |
| 6,504,846 | B1 | 1/2003 | Yu et al. |
| 6,526,518 | B1 | 2/2003 | Catlin et al. |
| 6,546,010 | B1 | 4/2003 | Merchant et al. |
| 6,564,271 | B2 | 5/2003 | Micalizzi, Jr. et al. |
| 6,594,329 | B1 | 7/2003 | Susnow |
| 6,604,224 | B1 | 8/2003 | Armstrong et al. |
| 6,636,909 | B1 | 10/2003 | Kahn et al. |
| 6,643,748 | B1 | 11/2003 | Wieland |
| 6,671,776 | B1 | 12/2003 | DeKoning |
| 6,671,832 | B1 | 12/2003 | Apisdorf |
| 6,721,799 | B1 | 4/2004 | Slivkoff |
| 6,725,388 | B1 | 4/2004 | Susnow |
| 6,763,398 | B2 | 7/2004 | Brant et al. |
| 6,775,693 | B1 | 8/2004 | Adams |
| 6,810,440 | B2 | 10/2004 | Micalizzi, Jr. et al. |
| 6,810,442 | B1 | 10/2004 | Lin et al. |
| 6,871,248 | B2 | 3/2005 | Riley |
| 7,000,025 | B1 | 2/2006 | Wilson |
| 7,155,553 | B2 * | 12/2006 | Lueck et al. ............... 710/305 |
| 7,230,549 | B1 * | 6/2007 | Woodral et al. ............... 341/52 |
| 7,231,480 | B2 | 6/2007 | Woodral |
| 7,231,560 | B2 * | 6/2007 | Lai et al. ............... 714/712 |
| 7,254,206 | B2 * | 8/2007 | Chiang ............... 375/371 |
| 2002/0069317 | A1 | 6/2002 | Chow et al. |
| 2002/0147802 | A1 | 10/2002 | Murotani et al. |
| 2003/0056032 | A1 | 3/2003 | Micalizzi et al. |
| 2003/0097481 | A1 | 5/2003 | Richter |
| 2003/0126320 | A1 | 7/2003 | Liu et al. |
| 2003/0161429 | A1 * | 8/2003 | Chiang ............... 375/371 |
| 2004/0073862 | A1 | 4/2004 | Armstrong et al. |
| 2004/0267982 | A1 | 12/2004 | Jackson et al. |
| 2005/0058148 | A1 | 3/2005 | Castellano et al. |
| 2005/0093575 | A1 | 5/2005 | Schoenborn et al. |
| 2005/0104623 | A1 | 5/2005 | Guo et al. |
| 2005/0141661 | A1 | 6/2005 | Renaud et al. |
| 2006/0095607 | A1 * | 5/2006 | Lim et al. ............... 710/52 |
| 2006/0123298 | A1 * | 6/2006 | Tseng ............... 714/733 |
| 2006/0129733 | A1 | 6/2006 | Sobelman |
| 2006/0156083 | A1 * | 7/2006 | Jang et al. ............... 714/700 |
| 2006/0209735 | A1 * | 9/2006 | Evoy ............... 370/315 |
| 2006/0253757 | A1 * | 11/2006 | Brink et al. ............... 714/738 |
| 2007/0011534 | A1 * | 1/2007 | Boudon et al. ............... 714/732 |
| 2007/0124623 | A1 | 5/2007 | Tseng |
| 2007/0177701 | A1 * | 8/2007 | Thanigasalam ............... 375/372 |
| 2007/0262891 | A1 * | 11/2007 | Woodral et al. ............... 341/51 |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

OTHER PUBLICATIONS

International Preliminary Report on Patentability dated Mar. 27, 2007, for International patent appllication No. PCT/US2005/031660.

Houghton Mifflin Company, "Definition of the term "network"", Source: The American Heritage College Dictionary", Fourth Edition,(2002),934.

"PCI Express Base Specification Revision 1.0", (Apr. 29, 2002), 195-196.

"PCI Express Base Specification Revision 1.0", *PCI-SIG*, (Apr. 29, 2002),183, 184, 199-201.

"PCI Express Base Specification Revision 1.0a", *PCI-SIG*, (Apr. 15, 2003),171, 172, 204 & 205.

Budruk, Ravi, et al., "PCI Express System Architecture", (2004),434,436-439,442-443.

Malavalli, Kumar , "High Speed Fibre Channel Switching Fabric Services", *Proceedings of the SPIE, SPIE*, Bellingham, VA, USA vol. 1577,, XP000562869, ISSN: 0277-786X,(Sep. 4, 1991),216-226.

"Fibre Channel Framing and Signaling (FC-FS) Rev. 1.10", *American National Standards Institute, Inc. (ANSI)*, retrieved from the internet on Nov. 15, 2007 at ftp://ftp.t11.org/t11/pub/fc/fs/01-024v1. pdf,(Jan. 25, 2001),319-320.

"Office Action from USPTO dated Apr. 6, 2007 for U.S. Appl. No. 10/956,718".

"Office Action from USPTO dated Feb. 1, 2007 for U.S. Appl. No. 10/935,919".

"Office Action from USPTO dated Oct. 2, 2007 for U.S. Appl. No. 10/935,919".

"Office Action from USPTO dated Aug. 30, 2007 for U.S. Appl. No. 11/746,486".

\* cited by examiner

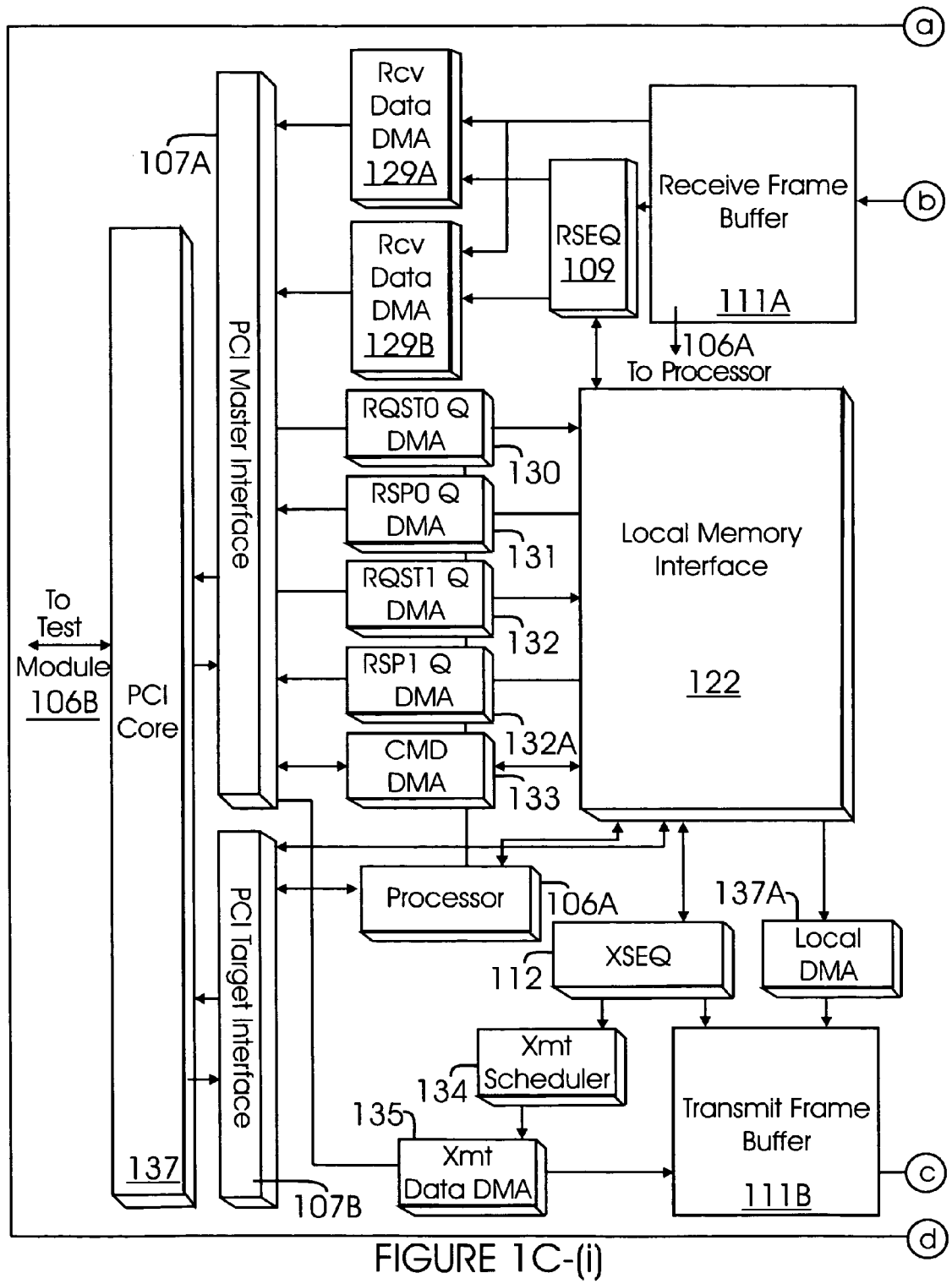
FIGURE 1C-(i)

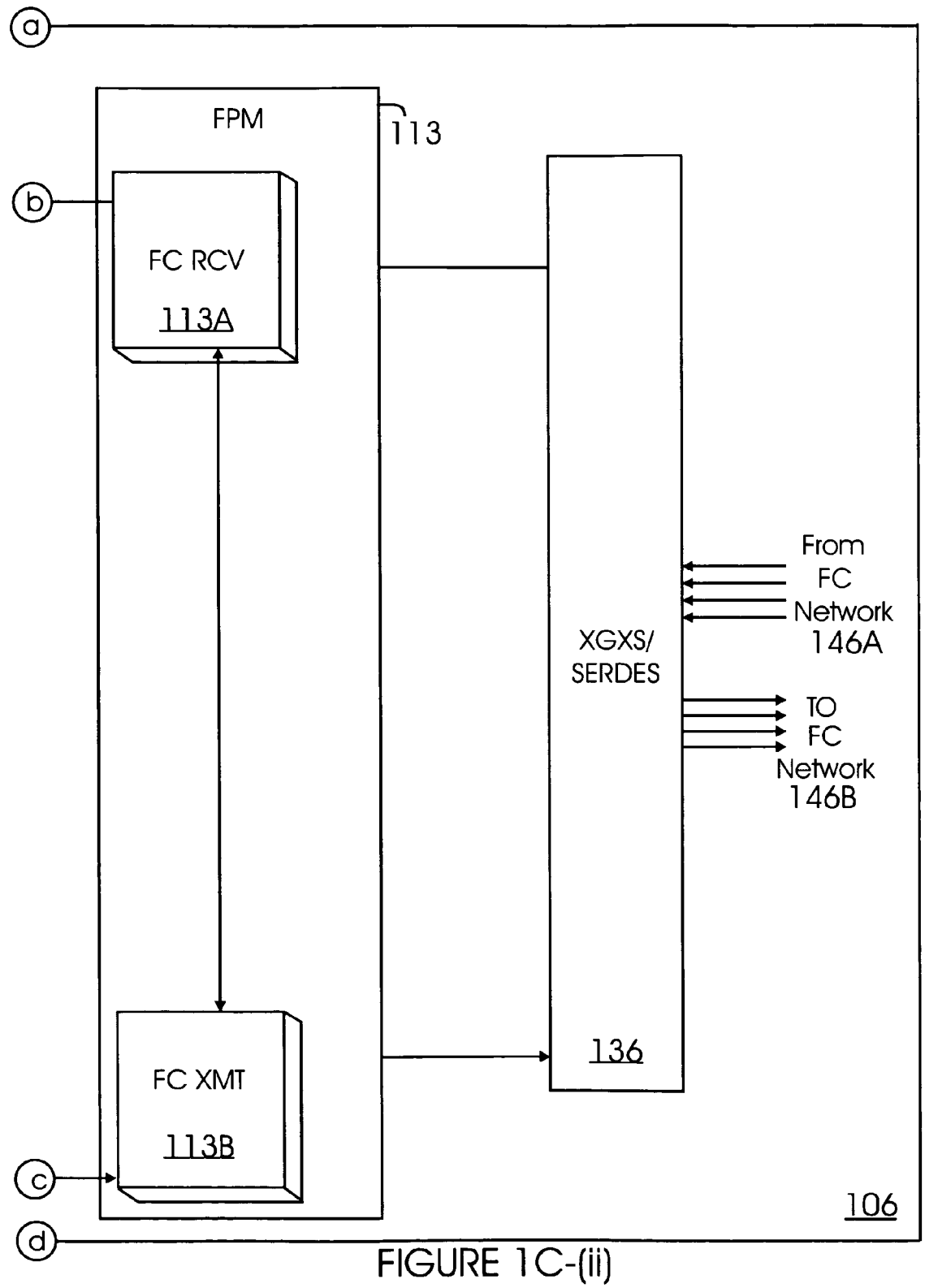
FIGURE 1C-(ii)

METHOD AND SYSTEM FOR TESTING HOST BUS ADAPTERS

BACKGROUND

1. Field of the Invention

The present invention relates to host bus adapters, and more particularly to testing host bus adapters with PCI-Express port logic.

2. Background of the Invention

Storage area networks ("SANs") are commonly used where plural memory storage devices are made available to various host computing systems. Data in a SAN is typically moved between plural host systems (that include computer systems, servers etc.) and storage systems (or storage devices, used interchangeably throughout this specification) through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety.

PCI-Express is another Input/Output ("I/O") bus standard (incorporated herein by reference in its entirety) used in this environment. PCI-Express uses discrete logical layers to process inbound and outbound information.

Various other standard interfaces are also used to move data between host systems and storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

HBAs that are placed in SANs receive serial data, align the serial data and then convert it into parallel data. A HBA determines data boundary before performing the alignment operation. A comma character is often used by the HBA to determine character and word alignment in a serial stream of data. Once a comma character is detected the HBA assumes that the received character/words are on the same boundary. Hence, it is important for a HBA to properly detect comma (or any other special character) characters in a bit stream in order to correctly process data thereafter. A HBA typically uses a state machine (or other piece of hardware) to detect comma characters and perform the alignment.

Conventional systems do not provide an efficient methodology to periodically test a HBA's ability to detect comma characters and then perform the re-alignment. Therefore, there is a need for a method and system that can generate random data and test a HBA's ability to detect comma characters and reacquire correct alignment, if needed.

SUMMARY OF THE INVENTION

In one aspect of the present invention, a system for testing a host bus adapter's ("HBA's") ability to handle stream of invalid characters is provided. The system includes, a data presenter module that presents data to a HBA without being aware of a data format; a data producer module that is aware of the data format and schedules special characters so that the HBA can perform alignment operations; and a bit offset change module that changes a bit offset that is used by the data presenter module and causes to send random serial data to the HBA, which results in loss of alignment in the HBA and causes the HBA to decode invalid characters.

In another aspect of the present invention, a method for testing a host bus adapter's ("HBA's") ability to handle stream of invalid characters is provided. The method includes, selecting random data, wherein a data producer module selects random data and is aware of a data format, and schedules special characters in the random data so that the HBA can perform alignment operations; converting the random data to a format that is acceptable to a receive channel in the HBA; and setting a bit off-set that results in loss of alignment in the HBA and causes the HBA to decode invalid characters, wherein a bit-offset module sets the bit offset.

In yet another aspect of the present invention, a testing module for testing a host bus adapter's ("HBA's") ability to handle stream of invalid characters is provided. The testing module includes a data presenter module that presents data to a HBA without being aware of a data format; a data producer module that is aware of the data format and schedules special characters so that the HBA can perform alignment operations; and a bit offset change module that changes a bit offset that is used by the data presenter module and causes to send random serial data to the HBA, which results in loss of alignment in the HBA and causes the HBA to decode invalid characters.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1C shows a block diagram of a HBA that is tested, according to one aspect of the present invention;

DETAILED DESCRIPTION OF THE PREFERRED EMBODIMENTS

To facilitate an understanding of the preferred embodiment, the general architecture and operation of a System will be described. The specific architecture and operation of the preferred embodiment will then be described with reference to the general architecture.

Figure 1A:
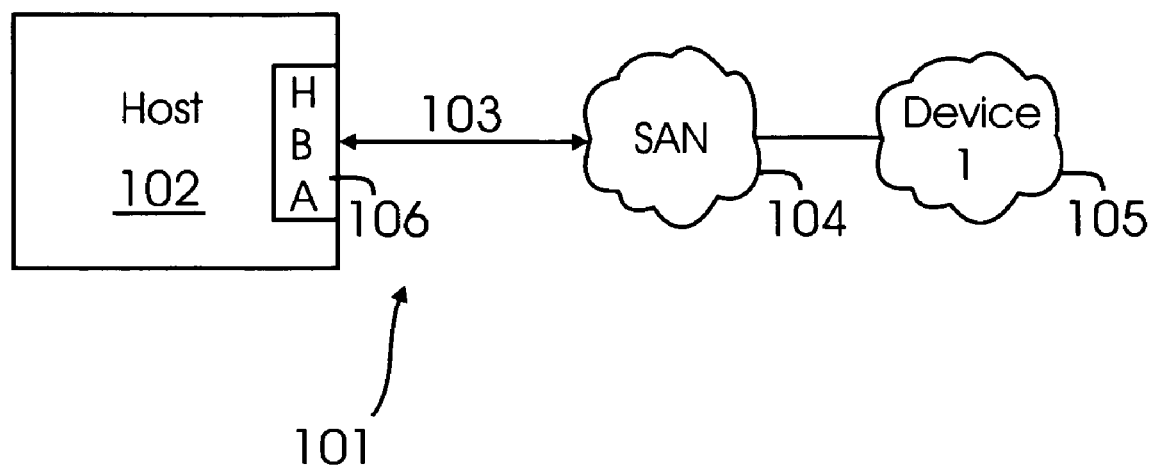
FIG. 1A shows a block diagram of a system with a host bus adapter that is tested according to one aspect of the present invention.

FIG. 1A shows a block diagram of a system 101 where a host computing system 102 is coupled to a storage device 105 via a SAN 104. HBA 106 facilitates data transfer between host 102 and device 105 (shown as 103).

Figure 1B:
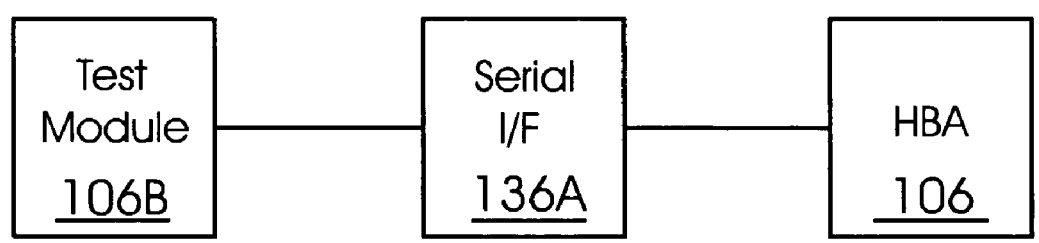
FIG. 1B shows a block diagram of a test module functionally coupled to a HBA, according to one aspect of the present invention.

FIG. 1B shows a system for testing HBA 106 that is coupled to a test module 106B via a serial interface 136A. It is noteworthy that the adaptive aspects of the present invention are not limited to a serial interface. Test module 106B operates as a part of any computing system. Test module 106B is not limited to any particular interface/operating system.

FIG. 1C shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to a PCI-Express Core logic 137 (may also be referred to as "logic 137"). Interface 107A and 107B includes an arbitration module that processes DMA access to plural DMA channels.

Figure 2A:
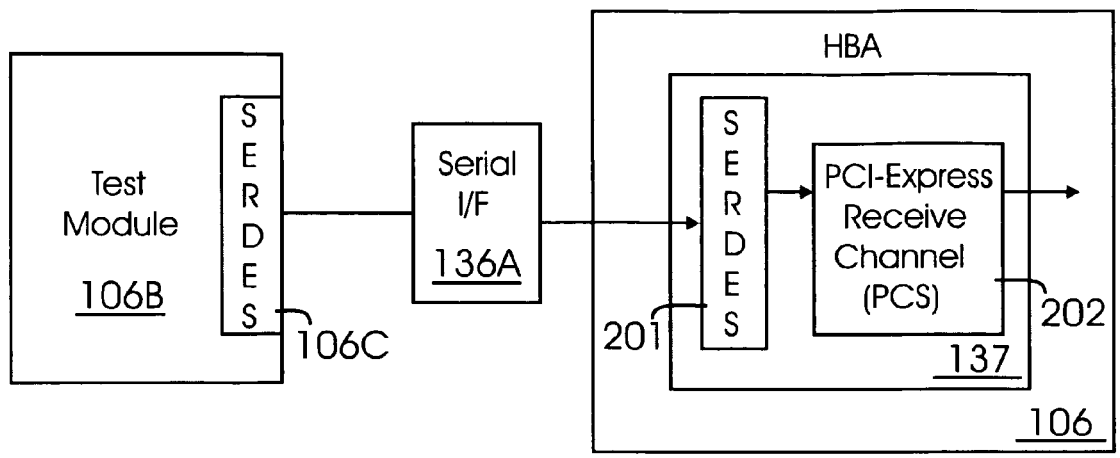
FIG. 2A shows a block diagram of a system for testing a HBA, according to one aspect of the present invention.

FIG. 2A shows a block diagram with certain components of logic 137 that are used for testing HBA 106. Logic 137 includes a serial/de-serializer 201 and a PCI-Express receive channel ("PCS") 202 that are described below in detail.

Testing module 106B sends random serial data via SERDES 106C and serial interface 136A. SERDES 201 receives the incoming data stream and passes the data stream to PCS 202.

Figure 2B:
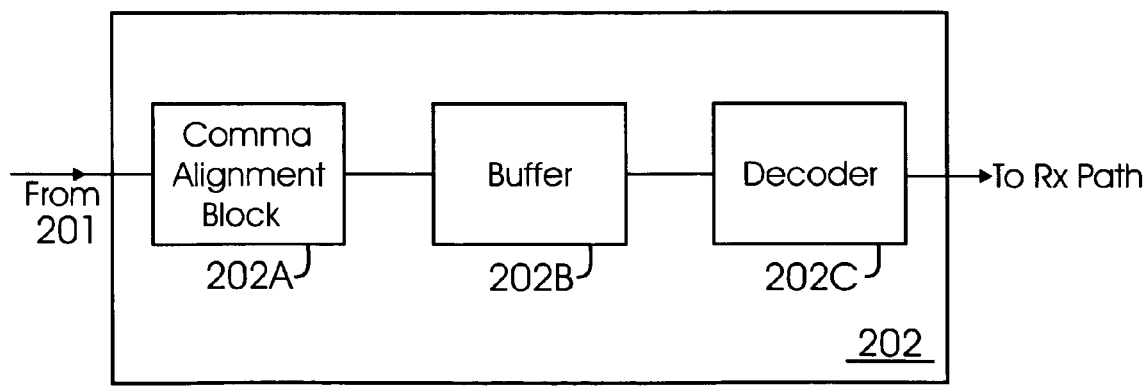
FIG. 2B shows a block diagram of a PCI-Express receive channel that is used for testing a HBA, according to one aspect of the present invention.

FIG. 2B shows a block diagram of PCS 202 with a comma alignment block 202A, a buffer 202B and a decoder 202C. Typically SERDES 201 sends 10-bit data that is received by PCS 202. A comma character may be used to determine where data boundary begins (or ends). The incoming bits from SERDES 201 are synchronized with respect to the comma character.

Figure 2C:
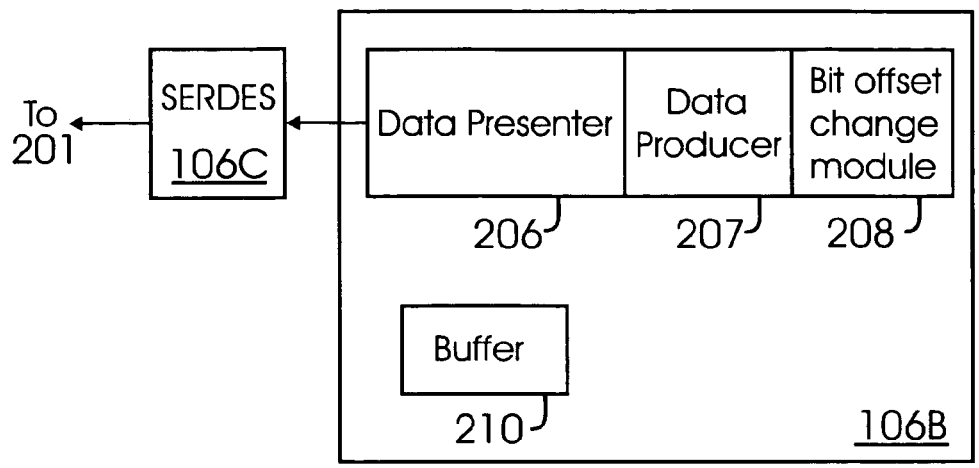
FIG. 2C shows the architecture of a software module for testing a HBA, according to one aspect of the present invention.
Figure 2D:
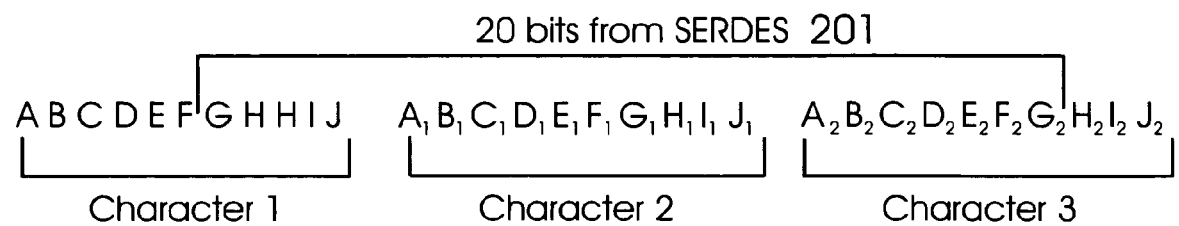
FIG. 2D shows an example of character/word alignment that is used for testing a HBA, according to one aspect of the present invention.

FIG. 2D shows an example of how data is sent from SERDES 201. Three characters 1, 2 and 3 are shown in FIG. 2D. The 20 bits from SERDES 201 may have bits from all the three characters. Hence, it is important to detect a comma character, which allows synchronization of comma characters with words.

Comma alignment block 202A includes a state machine (not shown) that determines where a comma character is located in a bit stream received from SERDES 201. Based on the location of the comma character, the incoming bits are re-aligned and then stored in a buffer 202B. Decoder 202C decodes 10-bit data to 8-bit data and the decoded 8-bit data is sent to other components in HBA 106 for processing.

To ensure that a comma character is detected accurately, and proper bit alignment takes place in PCS 202, testing module 106B uses a software module that is shown in FIG. 2C. The software module includes a data presenter module 206, data producer module 207 and a bit offset change module 208.

Figure 4:
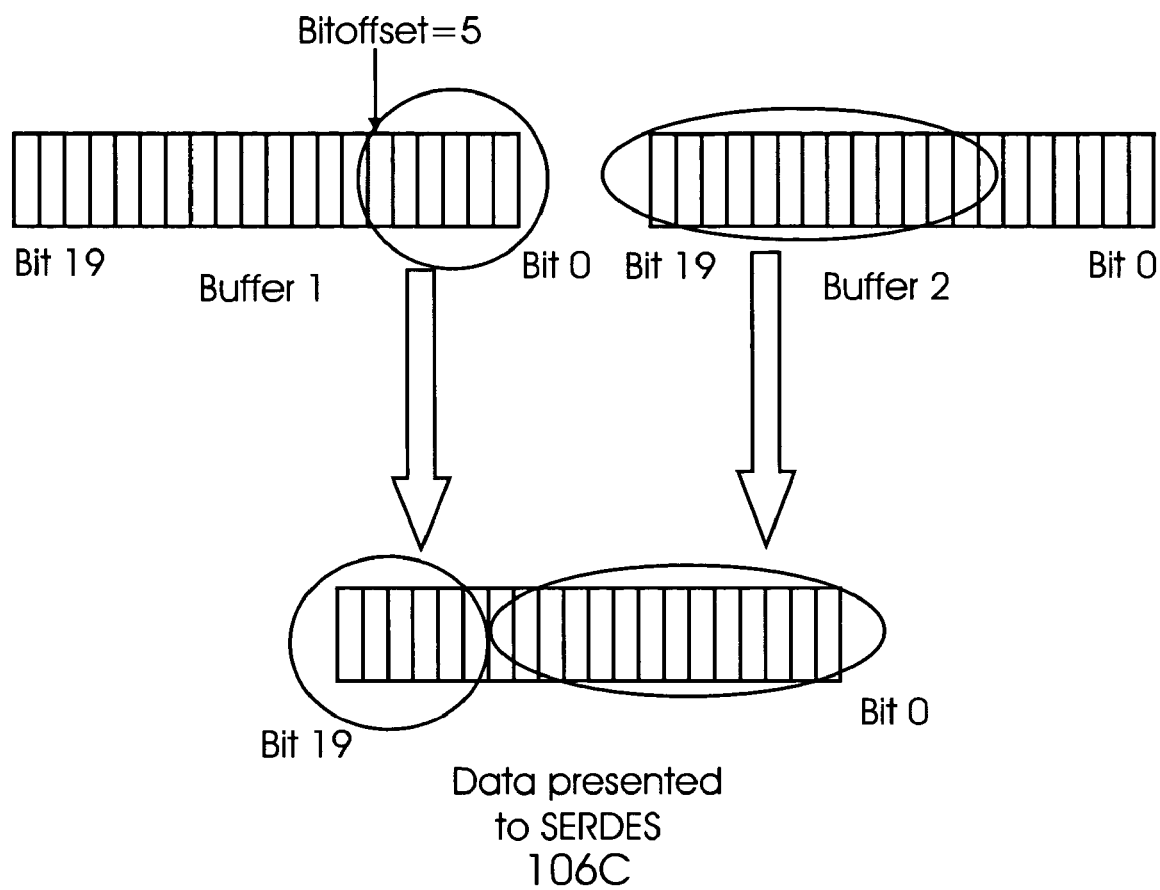
FIG. 4 shows an example of a bit-offset used for testing HBAS, according to one aspect of the present invention.

Data presenter module 206 presents 20-bit blocks of data that is sent to SERDES 106C. Data presenter module 206 is unaware of data formatting. Data presenter module 206 uses buffer 210 to present the data. Buffer 210 may be a circular buffer. The size of buffer 210 depends on the type of interface that is used. For example, if a 20-bit interface is used on the receiver side (i.e. PCS 202 side) then a buffer that can accommodate the 20-bit is used by data presenter module 206. It is noteworthy that buffer 210 may include more than one buffer, as shown in FIG. 4.

Data Producer module 207 is a software thread that is aware of the data format used by the receiver (PCS 202 in HBA 106). Data producer module 207 may choose to create 8-bit data and then convert it into 10-bits. Data in 10-bit format is stored in buffer 210 from where data presenter module 206 sends the data to SERDES 201 via SERDES 106C.

Data producer module 207 schedules (or inserts) sufficient number of comma characters to allow PCS 202 to perform periodic alignment operations (using comma alignment block 202A). Although data producer module 207 inserts (or commands insertion of) comma characters, it is unaware of any synchronization or loss of synchronization that may occur at PCS 202.

Buffer 210 is also useful, if HBA 106 (via PCS 202) wants to examine historical data that is sent by testing module 106B. This history allows for latency between the time testing module 106B (the transmitter) has sent data and the time HBA 106 receives data, converts it to parallel data and converts the 10-bit data into 8-bit data.

Bit offset change module 208 is unaware of any of the data that is being operated on by data producer module 207 and/or data presenter module 206. Bit offset change module 208 changes the bit offset that is used by data presenter module 206. This sends random data from testing module 106B to HBA 106. This will cause a loss of alignment by the receiver (PCS 202) and force comma alignment block 202A to perform character re-alignment after the loss of alignment. HBA 106 in general and PCS 202 in particular are tested to see if the character alignment is performed properly after the bit offset.

Standard testing software/hardware may used in conjunction with testing module 106B to track/monitor how HBA 106 performs re-alignment after it receives random data via SERDES 106C, as described above.

Figure 3:
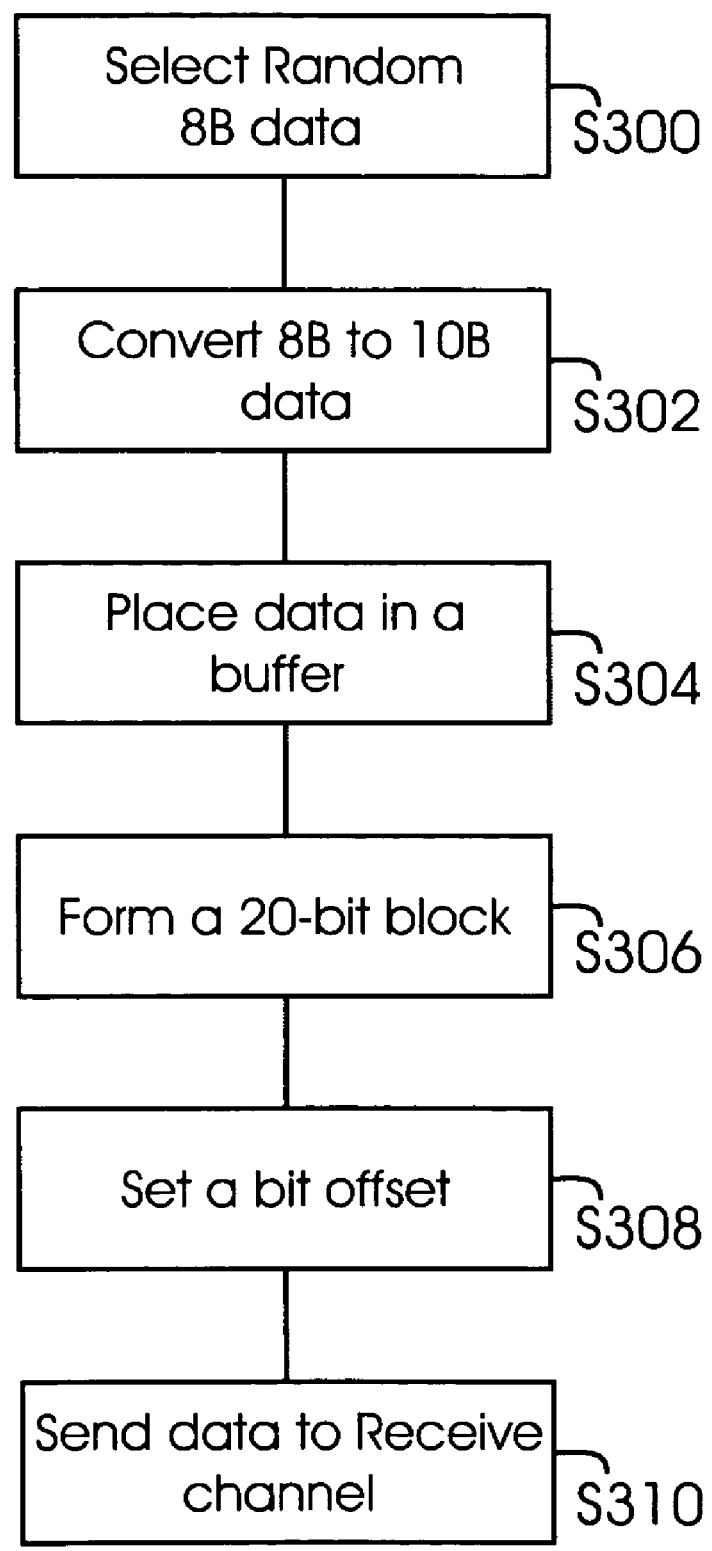
FIG. 3 shows a process flow diagram for testing a HBA, according to one aspect of the present invention.

FIG. 3 shows a process flow diagram for inducing data alignment errors and testing HBA 106 under the induced errors, according to one aspect of the present invention.

Turning in detail to FIG. 3, in step S300, data producer module 207 selects the data that is to be sent to HBA 106. In one aspect, the data may be in 8-bit format.

In step S302, the 8-bit data is converted into a 10-bit format. In step S304, the data is placed in buffer 210. In step S306, a 20-bit block of data is created in buffer 210 and in step S308, a bit offset is set by bit offset change module 208. Thereafter, data is sent to PCS 202 in step S310.

FIG. 4 shows an example of how the bit-offset are used to send data from via SERDES 106C. Buffer 1 and buffer 2 are a part of buffer 210. The bit-offset is set at 5 and data presenter module 206 then presents the data to SERDES 106C and then to PCS 202 via SERDES 201.

In one aspect of the present invention, character/word synchronization is lost in PCS 202 and this causes a stream of invalid characters to be sent. This forces state machines (not shown) in HBA 106 to be tested. Hence, HBA 106's character alignment function can be tested from any platform using test module 106B.

Although the present invention has been described with reference to specific embodiments, these embodiments are illustrative only and not limiting. Many other applications and embodiments of the present invention will be apparent in light of this disclosure and the following claims.

What is claimed is:

1. A system for testing a host bus adapter's ("HBA's") ability to handle stream of invalid characters, comprising:
a computing system coupled to the HBA, where the computing system executes codes for: (a) a data presenter module that presents data to a HBA without being aware of a data format; (b) a data producer module that is aware of the data format and schedules special characters so that the HBA can perform alignment operations; and (c) a bit offset change module that changes a bit offset that is used by the data presenter module and causes to send random serial data to the HBA, which results in loss of alignment in the HBA and causes the HBA to decode invalid characters.

2. The system of claim 1, wherein the data presenter module sends 20-bit blocks of data.

3. The system of claim 1, wherein the data producer module creates 8-bit data, converts the 8-bit data into 10-bit data, before sending the 10-bit data to a circular buffer.

4. The system of claim 3, wherein the circular buffer is used for staging random data streams, before sending the data to the HBA.

5. The system of claim 1, wherein the data presenter module, the data producer module and the bit offset module operate in parallel.

6. A method for testing a host bus adapter's ("HBA's") ability to handle stream of invalid characters, comprising:
selecting random data, wherein a data producer module selects random data and is aware of a data format, and schedules special characters in the random data so that the HBA can perform alignment operations;
converting the random data to a format that is acceptable to a receive channel in the HBA; and
setting a bit off-set that results in loss of alignment in the HBA and causes the HBA to decode invalid characters, wherein a bit-offset module sets the bit offset.

7. The method of claim 6, wherein a data presenter module sends 20-bit blocks of data to the HBA.

8. The method of claim 7, wherein the data presenter module is unaware of the data format in which data is presented to the HBA.

9. The method of claim 6, wherein the data producer module creates 8-bit data, converts the 8-bit data into 10-bit data, before sending the 10-bit data to a circular buffer.

10. The method of claim 9, wherein the circular buffer is used for staging random data streams, before sending the data streams to the HBA.

11. The method of claim 6, wherein a data presenter module, the data producer module and the bit offset module operate in parallel.

12. A testing module for testing a host bus adapter's ("HBA's") ability to handle stream of invalid characters, comprising:
a computing system coupled to the HBA via a serial interface, where the computing system executes code for: (a) a data presenter module that presents data to a HBA without being aware of a data format; (b) a data producer module that is aware of the data format and schedules special characters so that the HBA can perform alignment operations; and (c) a bit offset change module that changes a bit offset that is used by the data presenter module and causes to send random serial data to the HBA, which results in loss of alignment in the HBA and causes the HBA to decode invalid characters.

13. The testing module of claim 12, wherein the data presenter module sends 20-bit blocks of data.

14. The testing module of claim 12, wherein the data producer module creates 8-bit data, converts the 8-bit data into 10-bit data, before sending the 10-bit data to a circular buffer.

15. The testing module of claim 14, wherein the circular buffer is used for staging random data streams, before sending the data to the HBA.

16. The testing module of claim 12, wherein the data presenter module, the data producer module and the bit offset module operate in parallel.

* * * * *

UNITED STATES PATENT AND TRADEMARK OFFICE
CERTIFICATE OF CORRECTION

PATENT NO. : 7,392,437 B2 Page 1 of 1
APPLICATION NO. : 11/039189
DATED : June 24, 2008
INVENTOR(S) : Gavin J Bowlby et al.

It is certified that error appears in the above-identified patent and that said Letters Patent is hereby corrected as shown below:

On the Title page, in field (74), Attorney, Agent, or Firm, in column 2, line 1, delete "O'Neiil" and insert -- O'Neill --, therefor.

Title page 2, under "Other Publications" in column 2, line 2, delete "appllication" and insert -- application --, therefor.

In column 3, line 7, delete "HBAS," and insert -- HBAs, --, therefor.

Signed and Sealed this

Eleventh Day of May, 2010

David J. Kappos
*Director of the United States Patent and Trademark Office*